(12) United States Patent
Luo et al.

(10) Patent No.: US 9,880,405 B2
(45) Date of Patent: Jan. 30, 2018

(54) SLOW-LIGHT SILICON OPTICAL MODULATOR

(71) Applicant: Oracle International Corporation, Redwood City, CA (US)

(72) Inventors: Ying Luo, San Diego, CA (US); Shiyun Lin, San Diego, CA (US); Xuezhe Zheng, San Diego, CA (US); Ashok V. Krishnamoorthy, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 15/609,554

(22) Filed: May 31, 2017

(65) Prior Publication Data

US 2017/0261772 A1    Sep. 14, 2017

Related U.S. Application Data

(62) Division of application No. 14/794,457, filed on Jul. 8, 2015, now Pat. No. 9,759,935.

(51) Int. Cl.
| | |
|---|---|
| *G02F 1/01* | (2006.01) |
| *G02F 1/025* | (2006.01) |
| *G02F 1/225* | (2006.01) |
| *G02F 1/015* | (2006.01) |
| *G02F 1/21* | (2006.01) |

(52) U.S. Cl.
CPC ............. *G02F 1/025* (2013.01); *G02F 1/0123* (2013.01); *G02F 1/2255* (2013.01); *G02F 2001/0151* (2013.01); *G02F 2001/212* (2013.01); *G02F 2202/32* (2013.01)

(58) Field of Classification Search
CPC ...... G02F 1/025; G02F 1/0123; G02F 1/2255; G02F 2202/32; G02F 2001/0151; G02F 2001/212
See application file for complete search history.

(56) References Cited

U.S. PATENT DOCUMENTS

2010/0316342 A1* 12/2010 Casey .............. B29D 11/00663
385/129

* cited by examiner

*Primary Examiner* — Ryan Lepisto
(74) *Attorney, Agent, or Firm* — Park, Vaughan, Fleming & Dowler LLP

(57) ABSTRACT

An optical modulator is described. This optical modulator may be implemented using silicon-on-insulator (SOI) technology. In particular, a semiconductor layer in an SOI platform may include a photonic crystal having a group velocity of light that is less than that of the semiconductor layer. Moreover, an optical modulator (such as a Mach-Zehnder interferometer) may be implemented in the photonic crystal with a vertical junction in the semiconductor layer. During operation of the optical modulator, an input optical signal may be split into two different optical signals that feed two optical waveguides, and then subsequently combined into an output optical signal. Furthermore, during operation, time-varying bias voltages may be applied across the vertical junction in the optical modulator using contacts defined along a lateral direction of the optical modulator.

9 Claims, 7 Drawing Sheets

SLOW-LIGHT SILICON OPTICAL MODULATOR

RELATED CASE

This application is a divisional application of, and hereby claims priority under 35 U.S.C. §120 to, pending U.S. patent application Ser. No. 14/794,457, entitled "Slow-Light Silicon Optical Modulator," by inventors Ying Luo, Shiyun Lin, Xuezhe Zheng, and Ashok V. Krishnamoorthy, filed on 8 Jul. 2015, and which is hereby incorporated by reference.

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure relates to techniques for communicating optical signals. More specifically, the present disclosure relates to a silicon optical modulator that includes a photonic crystal.

Related Art

Silicon photonics is a promising technology that can provide large communication bandwidth, large density, low latency and low power consumption for inter-chip and intra-chip connections. In the last few years, significant progress has been made in developing low-cost components for use in inter-chip and intrachip silicon-photonic connections, including: high-bandwidth efficient silicon modulators, low-loss optical waveguides, wavelength-division-multiplexing (WDM) components, and high-speed CMOS optical-waveguide photo-detectors.

Electro-optical modulation in silicon can be implemented by exploiting the free-carrier dispersion effect of silicon, or by incorporating various electro-optical materials such as a polymer, germanium and III-V compound semiconductor into a silicon-on-insulator (SOI) platform. Because of CMOS compatibility, simplicity of fabrication and high operation speed, carrier-depletion based modulation is typically used in optical modulators. In this approach, the concentration of free charges is used to change the real and imaginary parts of the index of refraction of silicon. In particular, under reverse bias, a pn junction embedded inside a silicon optical waveguide modulates its carrier-depletion region, therefore producing a phase shift of an optical signal. Note that this process can be very fast because it does not involve minority carrier diffusion.

It can be difficult to deplete large a amount of charge with a low driving voltage. The change in the index of refraction can be enhanced using a resonance effect (e.g., by using a micro-ring resonator). However, the extremely narrow bandwidth of most resonant devices usually limits their use over a wide range of temperatures. Alternatively, Mach-Zehnder interferometer (MZI) modulators have broad bandwidth that allows a wide temperature range of operation, but usually do not meet the requirements for optical interconnects because of their large size (usually in the millimeter range).

Recently, a slow-light structure with a low group velocity was implemented in MZI modulators to greatly increase the modulation efficiency, thereby reducing the device size dramatically. Note that the term 'slow light' refers to a reduction in the group velocity of light, and can be realized with many different approaches. One approach is based on material resonances, which usually requires bulky media, and low-temperature operation. Alternatively, another approach uses engineered photonic structures in which light bounces back and forth as it propagates forward, such as: a photonic crystal, a coupled resonator and/or waveguide-5 grating structures.

Photonic-crystal optical waveguides with flat-band slow light by band-gap engineering are usually chosen for the MZI modulator because they usually can be integrated with silicon optical waveguides, and because they provide a group index of refraction ($n_g$) of more than 20, while still maintaining relatively large bandwidth (such as 20-30 nm). With such a photonic-crystal implementation, the phase-shifter length of the MZI modulator can be significantly reduced to the sub-100 µm range. This can eliminate the need for complex travelling-wave electrode designs in order to meet high-speed requirements. Instead, lumped devices with simple electrodes can be used in the MZI modulator for high-speed applications without increasing the applied voltage.

However, the optical waveguide loss also increases linearly with the ability to slow down the group velocity of light. In particular, even though the arm length of the MZI modulator with slow light can be reduced by an order-of-magnitude, the overall insertion loss of a slow-light MZI modulator is still typically similar to that of the normal designs. Moreover, the excessive mismatch in the group index of refraction between the channel optical waveguide and photoniccrystal optical waveguide introduces additional coupling loss. Furthermore, the operating bandwidth of the slow light is inversely related to the enhancement of the group index of refraction. Consequently, the slower the light travels, the narrower the operating bandwidth will be. These design tradeoffs often limit the shortest achievable MZI arm length, and eventually can set an upper limit on the RC-limited device bandwidth.

In principle, the modulation efficiency can also be greatly improved with novel pn junction designs. In particular, because the pn diode in an electrooptical modulator is formed inside the optical waveguide, the pn junction design (including the junction position, the junction profile and the doping level) can significantly affect the electro-optical modulator performance. 5 However, it can be challenging to tailor the species and strengths of the doping to design a three-dimensional junction that maximizes the overlap with the optical mode, while also permitting standard, surface-normal fabrication.

Hence, what is needed is an electro-optical modulator without the above-described problems.

SUMMARY

One embodiment of the present disclosure provides an integrated circuit. This integrated circuit includes: a substrate; a buried-oxide (BOX) layer disposed on the substrate; and a semiconductor layer disposed on the buried-oxide layer. The semiconductor layer includes an array of holes, defined by edges, which implement a photonic crystal having a group velocity of light that is less than that of the semiconductor layer. Moreover, an optical modulator, having an input optical waveguide, a first optical waveguide, a second optical waveguide and an output optical waveguide, is defined, and the first optical waveguide and the second optical waveguide are defined in the photonic crystal. During operation of the optical modulator, an input optical signal received from the input optical waveguide is split into optical signals that, respectively, feed into the first optical waveguide and the second optical waveguide, and the optical signals from the first optical waveguide and the second optical waveguide are combined into an output optical signal that feeds into the output optical waveguide. Furthermore, the first optical waveguide and the second optical waveguide include a vertical junction defined by n-type doping of a lower portion of the semiconductor layer and p-type doping of an upper portion of the semiconductor layer. Additionally, during operation, time-varying bias voltages are applied across the vertical junction in the optical modulator using contacts defined along a lateral direction of the optical modulator.

Moreover, the optical modulator may have a push-pull configuration, so that, during operation, the first optical waveguide is driven with first time-varying bias voltages corresponding to data and the second optical waveguide is driven with second time-varying bias voltages corresponding to inverted data.

Furthermore, polarities of the time-varying bias voltages may alternate in different regions along lengths of the first optical waveguide and the second optical waveguide.

Additionally, the holes may have a cylindrical shape and may be filled with a different material than the semiconductor layer. For example, the material may include silicon dioxide.

In some embodiments, the photonic crystal has an approximately flat dispersion region and an increased index of refraction relative to that for the semiconductor layer for a range of wavelengths corresponding to an optical signal conveyed during operation of the optical modulator.

Note that the substrate, the BOX layer and the semiconductor layer may constitute a silicon-on-insulator technology.

Moreover, the optical modulator may include a Mach-Zehnder interferometer (MZI).

Furthermore, at least a portion of the photonic crystal may have a negative index of refraction.

Additionally, the first optical waveguide and the second optical waveguide may include tapers.

Another embodiment provides a system that includes: a processor; a memory that stores a program module; and the integrated circuit. During operation, the program module is executed by the processor.

Another embodiment provides a method for modulating the optical signal, which may be performed by the integrated circuit. During operation, the integrated circuit conveys the input optical signal in the input optical waveguide. Then, the integrated circuit splits the input optical signal into the optical signals in the first optical waveguide and the second optical waveguide, where the first optical waveguide and the second optical waveguide are defined in the BOX layer disposed on the substrate and the semiconductor layer disposed on the BOX layer.

Note that the semiconductor layer includes the array of holes, defined by the edges, which implement the photonic crystal having the group velocity of light that is less than that of the semiconductor layer. Moreover, the integrated circuit applies the time-varying bias voltage to the vertical junction in at least one of the first optical waveguide and the second optical waveguide using the contacts defined along the lateral direction of the at least the one of the first optical waveguide and the second optical waveguide, where the vertical junction is defined by n-type doping of the lower portion of the semiconductor layer and p-type doping of the upper portion of the semiconductor layer. Next, the integrated circuit combines the optical signals into the output optical signal in the output optical waveguide. Furthermore, the integrated circuit conveys the output optical signal in the output optical waveguide.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way.

Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical modulator (which is sometimes referred to as an 'electro-optical modulator'), an integrated circuit that includes the optical modulator, a system that includes the integrated circuit, and a technique for modulating an optical signal are described. This optical modulator may be implemented using silicon-on-insulator (SOI) technology. In particular, a semiconductor layer in an SOI platform may include a photonic crystal having a group velocity of light that is less than that of the semiconductor layer. Moreover, an optical modulator (such as a Mach-Zehnder interferometer or MZI) may be implemented in the photonic crystal with a vertical junction in the semiconductor layer. During operation of the optical modulator, an input optical signal may be split into two different optical signals that feed two optical waveguides, and then subsequently combined into an output optical signal. Furthermore, during operation, time-varying bias voltages may be applied across the vertical junction in the optical modulator using contacts defined along a lateral direction of the optical modulator.

By incorporating the photonic crystal, the optical modulator has flat-band, slow-light optical waveguides in the MZI, which provides phase-shift enhancement. Moreover, the use of a 3-dimensional (3D) doped vertical pn junction provides large optical mode confinement and, thus, much larger overlap within the depletion region with the optical mode. Consequently, the optical modulator may have a very compact footprint, extremely high modulation efficiency without increasing the total insertion loss (e.g., the phase efficiency may be enhanced by 6-10× by the slow light and 2-3× by the 3D pn junction), and wide optical bandwidth. Furthermore, the optical modulator may be operated as a lumped MZI for high-speed modulation, which can greatly simplify the electrodes and electrical driver design. The reduced arm length also leads to a reduced total device RC time constant. Therefore, under carrier-depletion operating conditions (where the photon life time is not the major hinderance for modulation bandwidth), high-speed modulation of up to 40 Gb/s can be achieved.

In the discussion that follows, MZIs are used as an illustration in the optical modulator. However, the modulation technique may be used with a wide variety of optical modulator designs and architectures.

Figure 1:
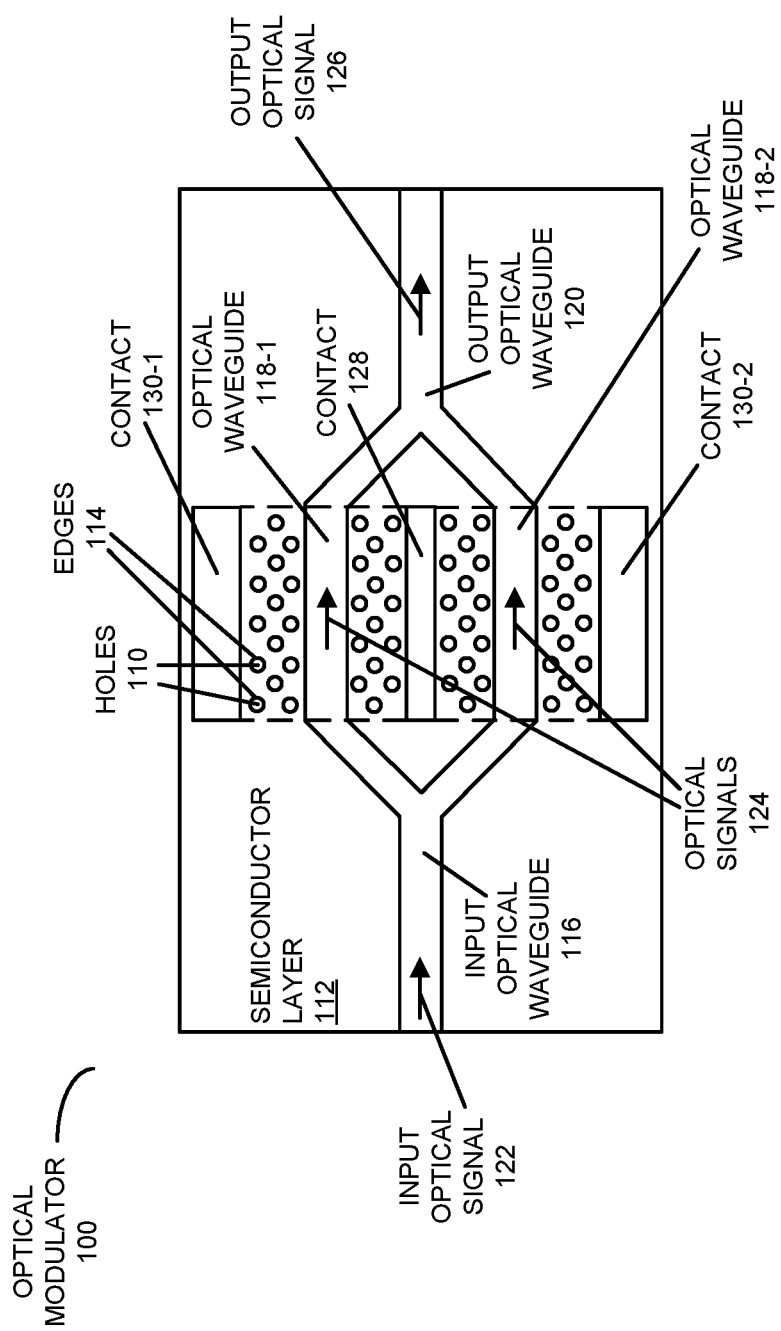
FIG. 1 is a block diagram illustrating a top view of an optical modulator in accordance with an embodiment of the present disclosure.

We now describe embodiments of the optical modulator. FIG. 1 presents a block diagram illustrating a top view of an optical modulator 100. This optical modulator may include an array of holes 110 in a semiconductor layer 112, defined by edges 114, which implement a photonic crystal having a group velocity of light that is less than that of semiconductor layer 112. (As described further below with reference to FIG. 5, semiconductor layer 112 may be included in an SOI technology or platform.) For example, holes 110 may have a cylindrical shape and may be filled with a different material than semiconductor layer 112, such as silicon dioxide.

Moreover, optical modulator 100 may include: an input optical waveguide 116, optical waveguides 118-1 and 118-2, and an output optical waveguide 120. As shown in FIG. 1, at least a portion of optical modulator 100 (such as optical waveguides 118) is defined in the photonic crystal.

During operation of optical modulator 100, an input optical signal 122 received from input optical waveguide 116 is split into optical signals 124 that, respectively, feed into optical waveguides 118, and optical signals 124 from optical waveguides 118 are combined into an output optical signal 126 that feeds into output optical waveguide 120. In an exemplary embodiment, optical modulator 100 includes an MZI, and combining optical signals 124 creates an interference effect. In particular, optical signals 124 may accumulate phase change at different rates while traversing the arms of the MZI (i.e., optical waveguides 118 which are implemented in the photonic crystal). When optical signals 124 are merged, they may interfere either constructively or destructively according to their relative phases.

Figure 2:
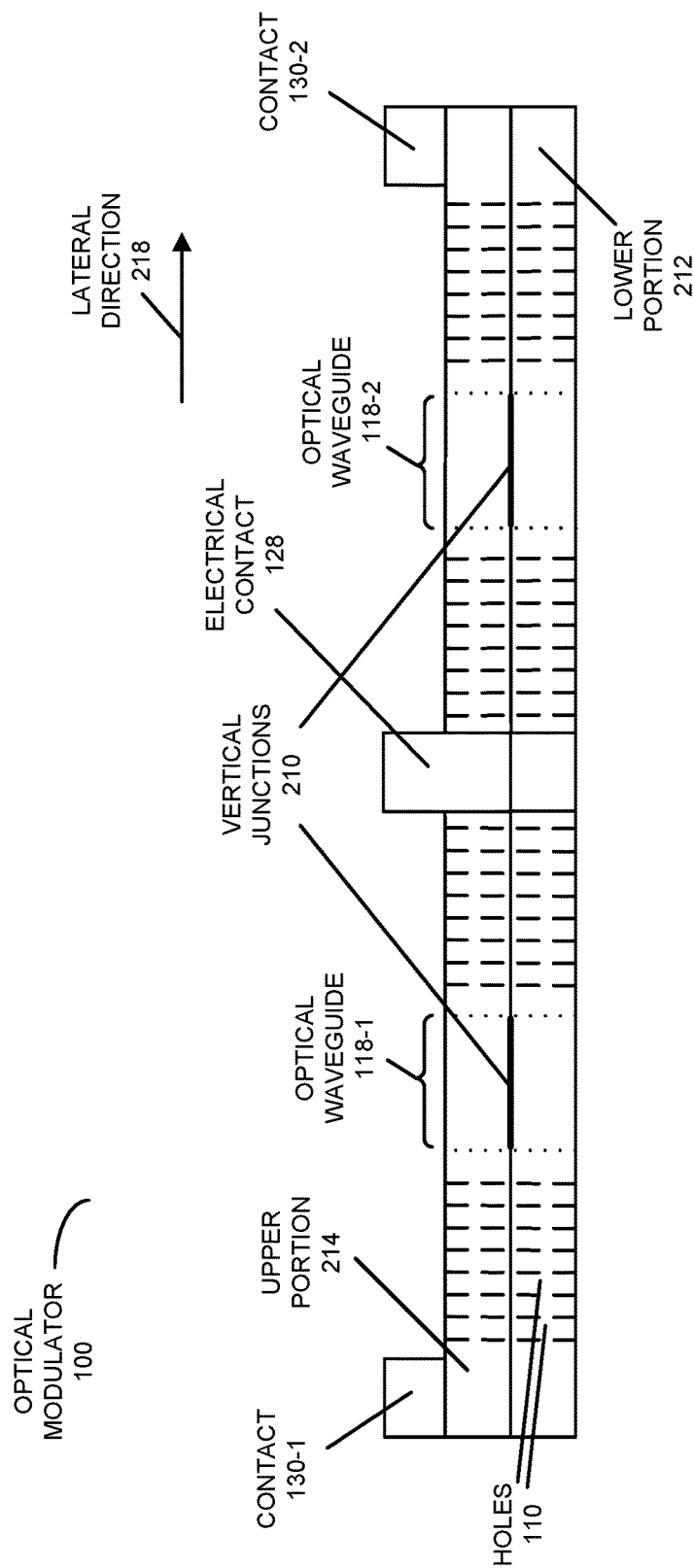
FIG. 2 is a block diagram illustrating a cross-sectional view of the optical modulator of FIG. 1 in accordance with an embodiment of the present disclosure.

Furthermore, as shown in FIG. 2, which presents a block diagram illustrating a cross-sectional view of optical modulator 100, optical waveguides 118 may include vertical junctions 210 defined by n-type doping of a lower portion 212 of semiconductor layer 112 and p-type doping of an upper portion 214 of semiconductor layer 112. (Alternatively, lower portion 212 may be doped p-type and upper portion 214 may be doped n-type.) Note that a 'vertical junction' is a junction that runs parallel to the top and bottom surface of at least one of optical waveguides 118. In particular, n-type doped lower or bottom portions of semiconductor layer 112 in optical waveguides 118 are connected through a center n-type island, to form a single contact to the top n-type metal contact 128. The p-type doped upper or top portions of optical waveguides 118 may be connected to two separate p-type contacts 130. In an exemplary embodiment, the n-type doping and/or the p-type doping is $2\text{-}4\cdot 10^{18}$ cm$^{-3}$, which may be chosen in order to maintain a sufficiently short RC time constant for high-speed modulation and to simultaneously achieve a large phase shift. Moreover, note that the size of holes 110 (FIG. 1) can be designed to achieve sufficiently low total resistance of vertical junctions 210 to ensure that the RC delay of optical modulator 100 does not limit the speed of optical modulator 100. For example, holes 110 (FIG. 1) may have diameters of 215 nm and a center-to-center separation of 400 nm.

During operation, time-varying bias voltages are applied across vertical junctions 210 in optical modulator 100 using contacts 128 and 130 defined along a lateral direction 218 of optical modulator 100. The use of contacts 128 and 130 that are displaced laterally from vertical junctions 210 allows contacts 128 and 130 to be highly doped for low resistance without increasing the loss at vertical junctions 210.

Referring back to FIG. 1, optical modulator 100 may have a push-pull configuration, so that, during operation, optical waveguide 118-1 is driven with first time-varying bias voltages corresponding to data, and optical waveguide 118-2 is driven with second time-varying bias voltages corresponding to inverted data. (Alternatively, optical waveguide 118-1 may be driven with inverted data and optical waveguide 118-2 may be driven with data.) This approach may allow optical modulator 100 to be operated with a lower or reduced driving voltage. In particular, the push-pull configuration may increase the relative phase shift in one path (i.e., one of optical waveguides 118) and decreases it in the other path (i.e., the other one of optical waveguides 118) so that the overall phase difference or phase shift is doubled while the amplitude of bias voltage is kept the same.

Furthermore, polarities of the time-varying bias voltages may alternate in different regions along the length of optical waveguides 118. In an exemplary embodiment, the length is 50-200 µm and/or the modulation provided by optical modulator 100 is 200-300 pm/V, which, respectively, may constitute a 10× reduction in the length (and a commensurate increase in the modulation speed) and up to a 30× increase in modulation efficiency relative to existing MZI optical modulators.

Figure 3:
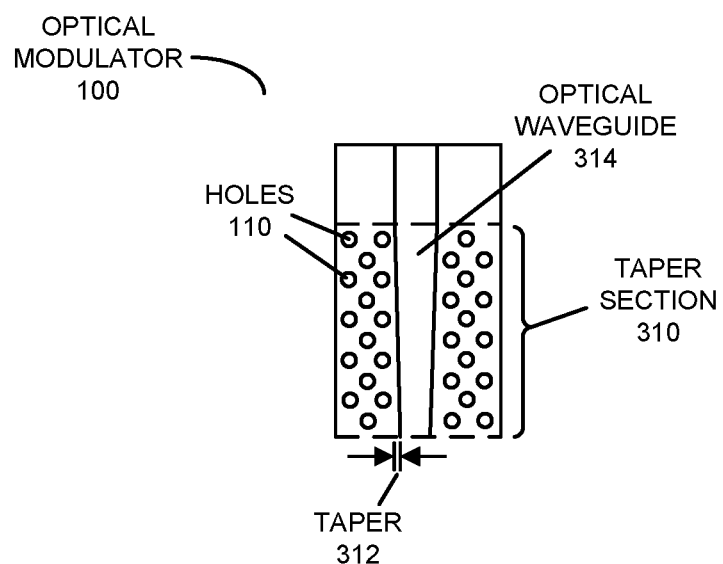
FIG. 3 is a block diagram illustrating a taper section in an optical waveguide in the optical modulator of FIGS. 1 and 2 in accordance with an embodiment of the present disclosure.

FIG. 3 presents a block diagram illustrating a taper section 310 with taper 312 in an optical waveguide 314 in optical modulator 100, such as at least one of optical waveguides 118 (FIG. 1). For example, taper sections may be inserted on both ends of optical waveguides 118 (FIG. 1) in the photonic crystal to reduce the coupling loss caused by the large group index of refraction mismatch between the channel input optical waveguide 116 and the channel output optical waveguide 120 and the slow-light photonic-crystal optical waveguides 118 (FIG. 1).

Figure 4:
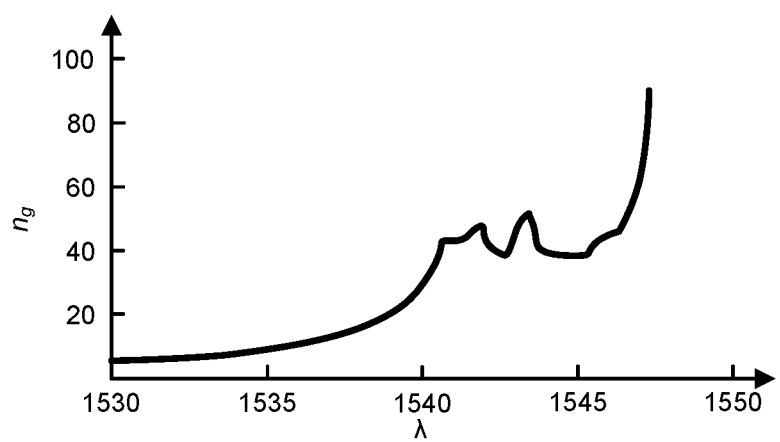
FIG. 4 is a drawing illustrating a simulated group index of refraction of the optical modulator of FIGS. 1 and 2 in accordance with an embodiment of the present disclosure.

The photonic crystal may have an approximately flat dispersion region and an increased index of refraction relative to that for semiconductor layer 112 (FIG. 1) for a range of wavelengths corresponding to an optical signal (such as input optical waveguide 116 in FIG. 1) conveyed during operation of optical modulator 100 (FIGS. 1-3). This is shown in FIG. 4, which presents a drawing illustrating a simulated group index of refraction ($n_g$) of optical modulator 100 (FIGS. 1-3) as a function of wavelength (λ). Furthermore, at least a portion of the photonic crystal may have a negative index of refraction.

The performance metrics for slow-light, photonic-crystal optical waveguides 118 (FIG. 1) may include a large group index of refraction, a large bandwidth, and a small insertion loss. The photonic-crystal optical waveguides 118 (FIG. 1) may provide a large group index of refraction at the band edge. However, a typical line-defect photonic-crystal optical waveguide may only have a sharp increase of the group index of refraction in a narrow frequency range close to the band edge. Band-gap-engineering techniques such as changing the size and shifting the positions of adjacent holes 110 (FIG. 1) can be used to achieve a flat band at the desired group index of refraction. For example, as shown in FIG. 4, a group index of refraction of 40 with a bandwidth of 7 nm can be achieved for a 220 nm thick silicon slab with silicon dioxide cladding. Note that a larger bandwidth with a smaller group index of refraction may be obtained by slightly shifting the holes adjacent to the photonic-crystal optical waveguide. Moreover, lattice shifting in both lateral and horizontal directions may provide flat-band, slow light. In an exemplary embodiment, the photonic crystal includes a hexagonal lattice of holes in a 220 nm thick silicon slab. The holes may have a diameter of 240 nm and a period of 420 nm. Moreover, the holes may be filled with silicon dioxide. This design may have a band edge at 1550 nm. A band width of 7 nm with a group index of refraction of 35 may be achieved by shifting two rows of holes adjacent to the optical waveguide outward by 110 nm and 40 nm, respectively. In another exemplary embodiment, a bandwidth of 20 nm with a group index of refraction of 15 is achieved by shifting the third row of holes by 250 nm along the symmetry direction of the optical waveguide.

In some embodiments, the optical modulator is optimized for the target application. For example, the optical modulator may be optimized based on the target modulation speed, the modulation bandwidth, the size, and/or other performance requirements. In particular, for applications where a modulation speed up to 40 Gb/s is needed, a photonic-crystal optical waveguide with a large group index of refraction (such as greater than 10× than that of semiconductor layer 112 in FIG. 1) can be designed at the cost of narrower optical bandwidth. A thin SOI platform (such as 200 or 220 nm SOI) may be used to maximize the advantages of the vertical junction.

Alternatively, for applications that require operation over larger temperature ranges, a moderate group index of refraction (such as 5-6× that of semiconductor layer 112 in FIG. 1) may be chosen for the slow-light photonic-crystal optical waveguide for a wider operation range. In addition, the 3D vertical junctions may be designed aggressively (such as using higher doping concentration or wider optical waveguides) in order to maintain the high-modulation efficiency. Although such a 3D vertical junction design may maximize the junction capacitance per unit length, the total capacitance of the optical modulator may not increase significantly because of the correspondingly shorter arm length. Modulation speeds larger than 25 Gb/s can be achieved with this design.

In summary, a silicon optical modulator with high modulation efficiency may combine the phase-shift enhancements from slow-light photonic-crystal optical waveguides and 3D vertical junctions to achieve high-speed modulation with a lumped MZI configuration. The enhanced phase-shift modulation efficiency may make this optical modulator suitable for applications requiring high-speed modulation and may also provide broadband operation in order to accommodate large temperature variations or process errors. Because the optical modulator may not require traveling-wave electrodes, it may also significantly simplify the design and fabrication yields, which may reduce the cost of the optical modulator.

Figure 5:
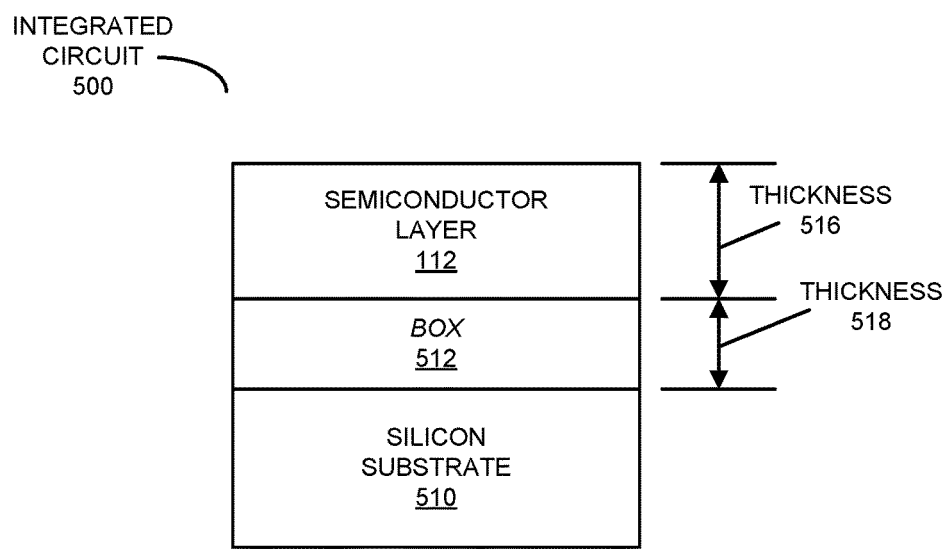
FIG. 5 is a block diagram illustrating an integrated circuit that includes the optical modulator of FIGS. 1 and 2 in accordance with an embodiment of the present disclosure.

As discussed previously, the optical modulator may be implemented in an integrated circuit, such as a photonic integrated circuit. FIG. 5 presents a block diagram illustrating an integrated circuit 500. This integrated circuit includes: a substrate 510, a buried-oxide (BOX) layer 512 disposed on substrate 510, and a semiconductor layer 112 disposed on buried-oxide layer 512. Optical components in the optical modulator may, at least in part, be included in buried-oxide layer 512 and semiconductor layer 112. In an exemplary embodiment, substrate 510 and semiconductor layer 112 include silicon and buried-oxide layer 512 includes silicon dioxide. Thus, substrate 510, buried-oxide layer 512 and semiconductor layer 112 may constitute a silicon-on-insulator technology.

Moreover, semiconductor layer 112 may have a thickness 516 that is less than 1 μm (such as 0.2-0.3 μm). Furthermore, buried-oxide layer 512 may have a thickness 518 between 0.3 and 3 μm (such as 0.8 μm). Note that a width of the optical waveguides may be 450-500 nm. In an exemplary embodiment, the optical waveguides convey an optical signal (i.e., light) having wavelengths between 1.1-1.7 μm, such as an optical signal having a fundamental wavelength of 1.3 or 1.55 μm.

Figure 6:
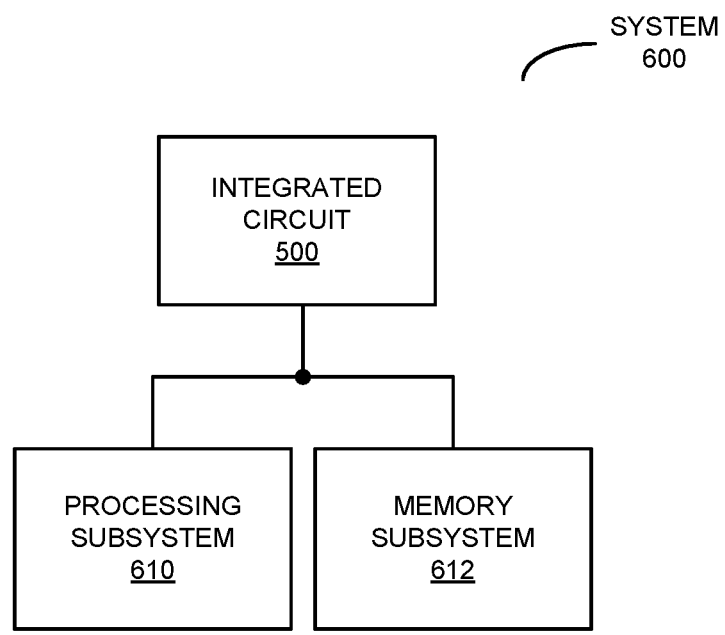
FIG. 6 is a block diagram illustrating a system that includes the integrated circuit of FIG. 5 in accordance with an embodiment of the present disclosure.

Integrated circuit 500 may be included in a system and/or an electronic device. This is shown in FIG. 6, which presents a block diagram illustrating a system 600 that includes integrated circuit 500. In some embodiments, system 600 includes processing subsystem 610 (with one or more processors) and memory subsystem 612 (with memory).

In general, functions of the integrated circuit and system 600 may be implemented in hardware and/or in software. Thus, system 600 may include one or more program modules or sets of instructions stored in an memory subsystem 612 (such as DRAM or another type of volatile or non-volatile computer-readable memory), which, during operation, may be executed by processing subsystem 610. Note that the one or more computer programs may constitute a computer-program mechanism. Furthermore, instructions in the various modules in memory subsystem 612 may be implemented in: a high-level procedural language, an object-oriented programming language, and/or in an assembly or machine language. Note that the programming language may be compiled or interpreted, e.g., configurable or configured, to be executed by the processing subsystem.

Components in system 600 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 600 may be at one location or may be distributed over multiple, geographically dispersed locations.

System 600 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the integrated circuit can be used in a wide variety of applications, such as: optical communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of the optical modulator, integrated circuit 500 and/or system 600 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical modulator, integrated circuit 500 and/or system 600 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the optical modulation technique may be used with other materials, as is known to one of skill in the art. Moreover, the semiconductor layer may include polysilicon or amorphous silicon. Furthermore, a lateral junction or an interleaved junction may be used in the optical modulator. Additionally, the materials and compounds in the optical modulator may be fabricated using a wide variety of processing techniques, including: evaporation, sputtering, molecular-beam epitaxy, wet or dry etching (such as photolithography or direct-write lithography), polishing, etc. In addition, a wide variety of optical components may be used in or in conjunction with the optical modulator.

Figure 7:
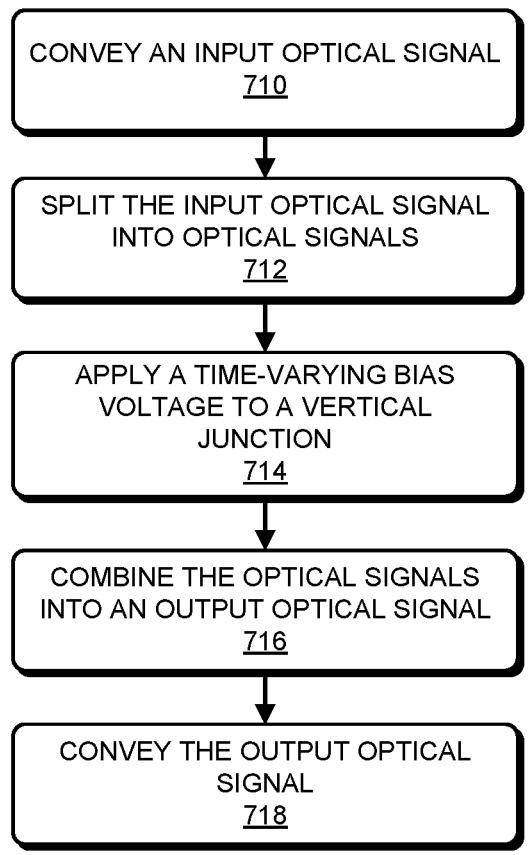
FIG. 7 is a flow chart illustrating a method for modulating an optical signal in accordance with an embodiment of the present disclosure.

We now describe embodiments of a method. FIG. 7 presents a flow chart illustrating a method 700 for modulating an optical signal, which may be performed using an optical modulator (such as optical modulator 100 in FIGS. 1-3). During operation, the optical modulator conveys an input optical signal (operation 710) in an input optical waveguide. Then, the optical modulator splits the input optical signal into optical signals (operation 712) in a first optical waveguide and a second optical waveguide, where the first optical waveguide and the second optical waveguide are defined in a BOX layer disposed on a substrate and a semiconductor layer disposed on a BOX layer. Note that the semiconductor layer includes an array of holes, defined by edges, which implement a photonic crystal having a group velocity of light that is less than that of the semiconductor layer.

Moreover, the optical modulator applies a time-varying bias voltage to a vertical junction (operation 714) in at least one of the first optical waveguide and the second optical waveguide using contacts defined along a lateral direction of the at least the one of the first optical waveguide and the second optical waveguide, where the vertical junction is defined by n-type doping of a lower portion of the semiconductor layer and p-type doping of an upper portion of the semiconductor layer.

Next, the optical modulator combines the optical signals into an output optical signal (operation 716) in an output optical waveguide. Furthermore, the optical modulator conveys the output optical signal (operation 718) in the output optical waveguide.

In some embodiments of method 700, there may be additional or fewer operations. Moreover, the order of the operations may be changed, and/or two or more operations may be combined into a single operation.

While the preceding embodiments illustrate the use of the optical modulator in conjunction with optical communication (such as in an optical link), the optical modulator may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:
1. A method for modulating an optical signal, wherein the method comprises:
conveying an input optical signal in an input optical waveguide;

splitting the input optical signal into optical signals in a first optical waveguide and a second optical waveguide, wherein the first optical waveguide and the second optical waveguide are defined in a buried-oxide (BOX) layer disposed on a substrate and a semiconductor layer disposed on the BOX layer, and wherein the semiconductor layer includes an array of holes, defined by edges, that implement a photonic crystal having a group velocity of light that is less than that of the semiconductor layer;

applying a time-varying bias voltage to a vertical junction in at least one of the first optical waveguide and the second optical waveguide using contacts defined along a lateral direction of the at least the one of the first optical waveguide and the second optical waveguide, wherein the vertical junction is defined by n-type doping of a lower portion of the semiconductor layer and p-type doping of an upper portion of the semiconductor layer, wherein the lower portion of the semiconductor layer is connected through a center n-type island, to form a single contact, and wherein the upper portion of the semiconductor layer is connected to two separate p-type contacts;

combining the optical signals into an output optical signal in an output optical waveguide; and conveying the output optical signal in an output optical waveguide.

2. The method of claim 1, wherein the photonic crystal has an approximately flat dispersion region and an increased index of refraction relative to that for the semiconductor layer for a range of wavelengths corresponding to the input optical signal.

3. The method of claim 1, wherein the substrate, the BOX layer and the semiconductor layer constitute a silicon-on-insulator technology.

4. The method of claim 1, wherein during operation, the first optical waveguide is driven with first time-varying bias voltages corresponding to data, and the second optical waveguide is driven with second time-varying bias voltages corresponding to inverted data.

5. The method of claim 1, wherein polarities of the time-varying bias voltages alternate in different regions along lengths of the first optical waveguide and the second optical waveguide.

6. The method of claim 1, wherein holes in the array of holes have a cylindrical shape and are filled with a different material than the semiconductor layer.

7. The method of claim 6, wherein the different material includes silicon dioxide.

8. The method of claim 1, wherein at least a portion of the photonic crystal has a negative index of refraction.

9. The method of claim 1, wherein the first optical waveguide and the second optical waveguide include tapers.

* * * * *

UNITED STATES PATENT AND TRADEMARK OFFICE
CERTIFICATE OF CORRECTION

PATENT NO. : 9,880,405 B2
APPLICATION NO. : 15/609554
DATED : January 30, 2018
INVENTOR(S) : Ying Luo et al.

It is certified that error appears in the above-identified patent and that said Letters Patent is hereby corrected as shown below:

In the Specification

Column 1, Line 53, please delete, "large a", and replace with --a large--

Column 2, Line 30, please delete, "photoniccrystal", and replace with --photonic crystal--

Column 2, Line 44, please delete, "5 However,", and replace with --However,--

Signed and Sealed this
Twenty-seventh Day of November, 2018

Andrei Iancu
*Director of the United States Patent and Trademark Office*